INVENTOR:
Paul W. Crapuchettes
By Clay Holland, Jr.
Attorney

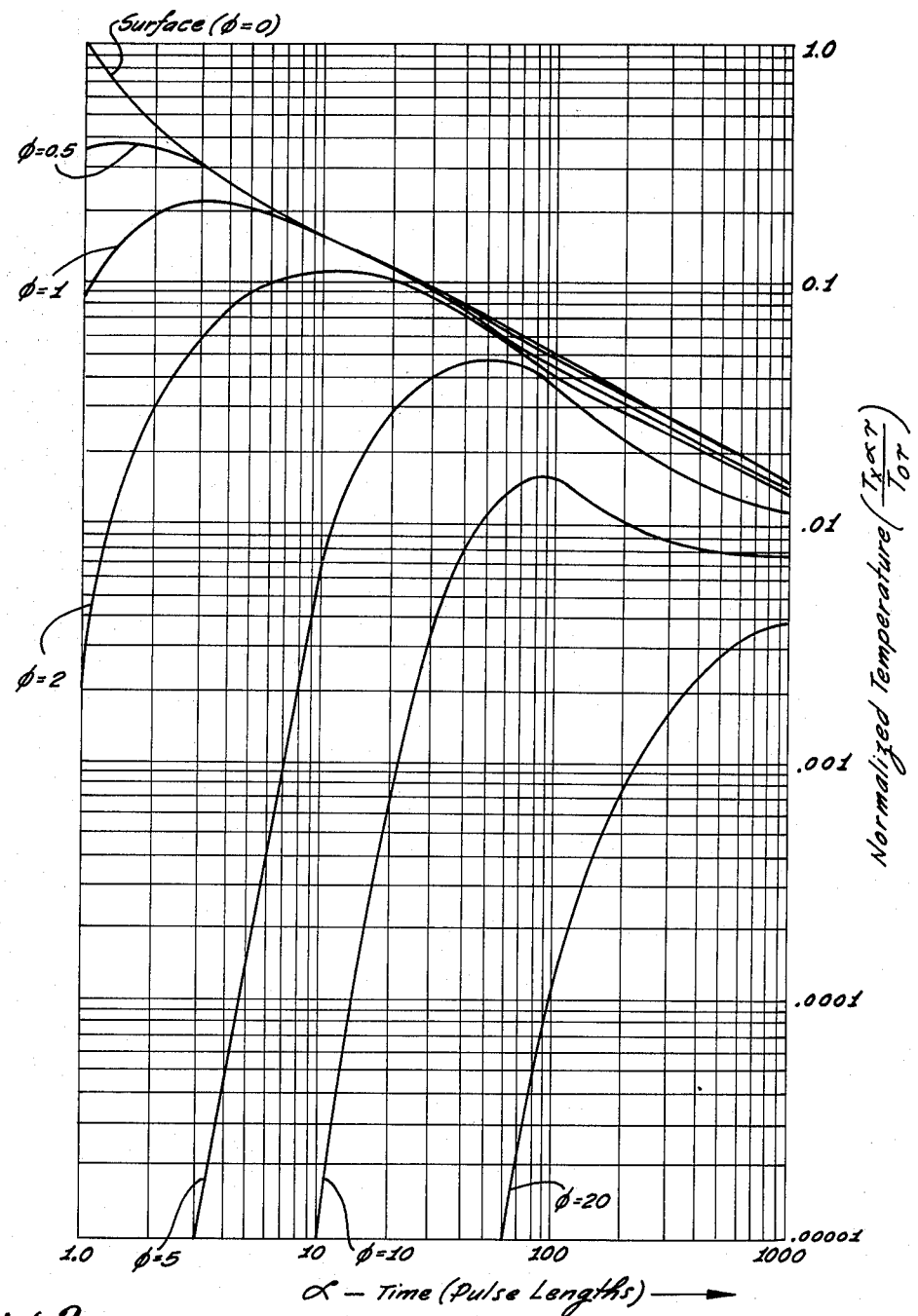
Fig. 2 Temperature Distribution for Semi-Infinite Body Following A Single Pulse INVENTOR:
Paul W. Crapuchettes
By Clay Holland, Jr.
Attorney

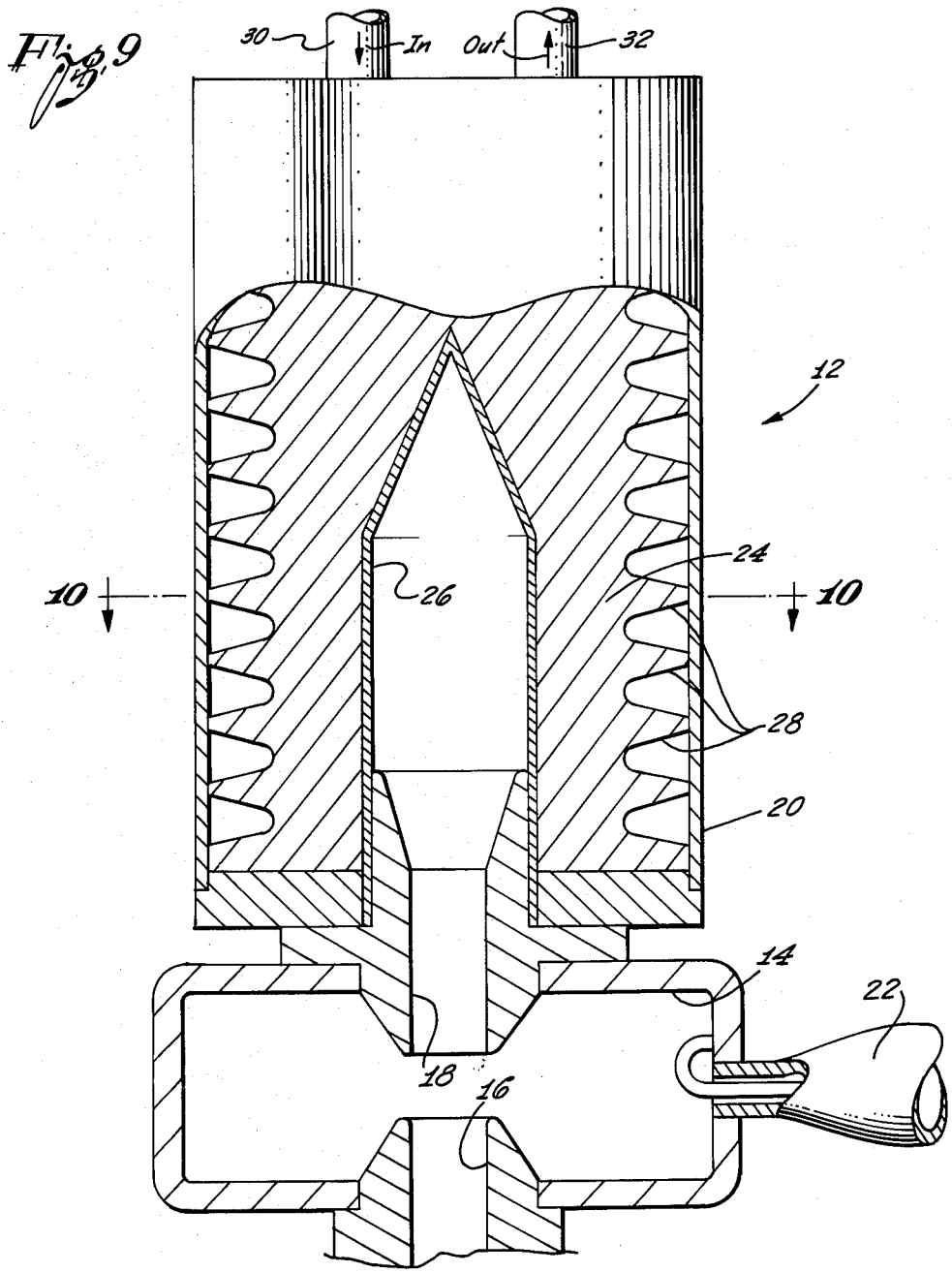

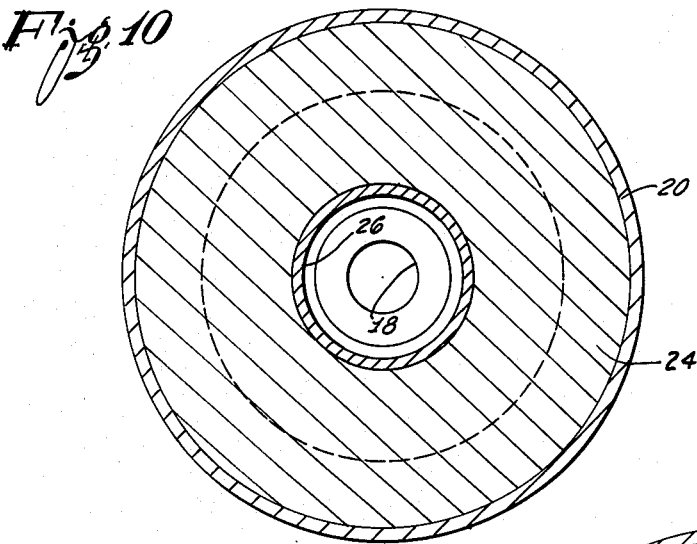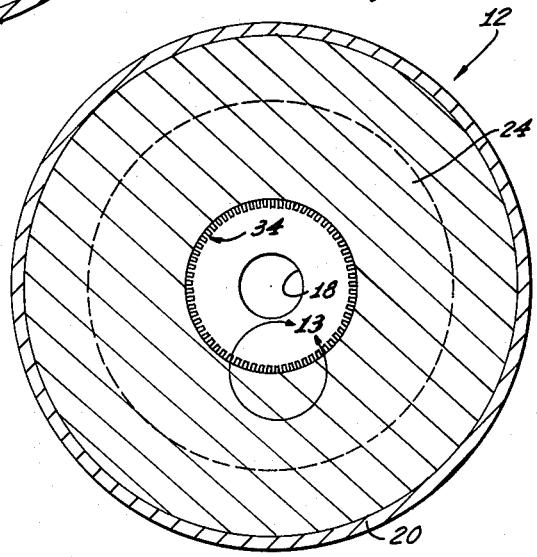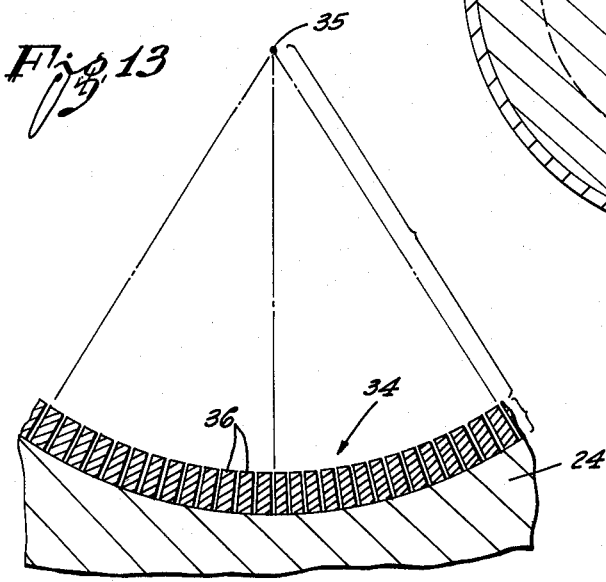

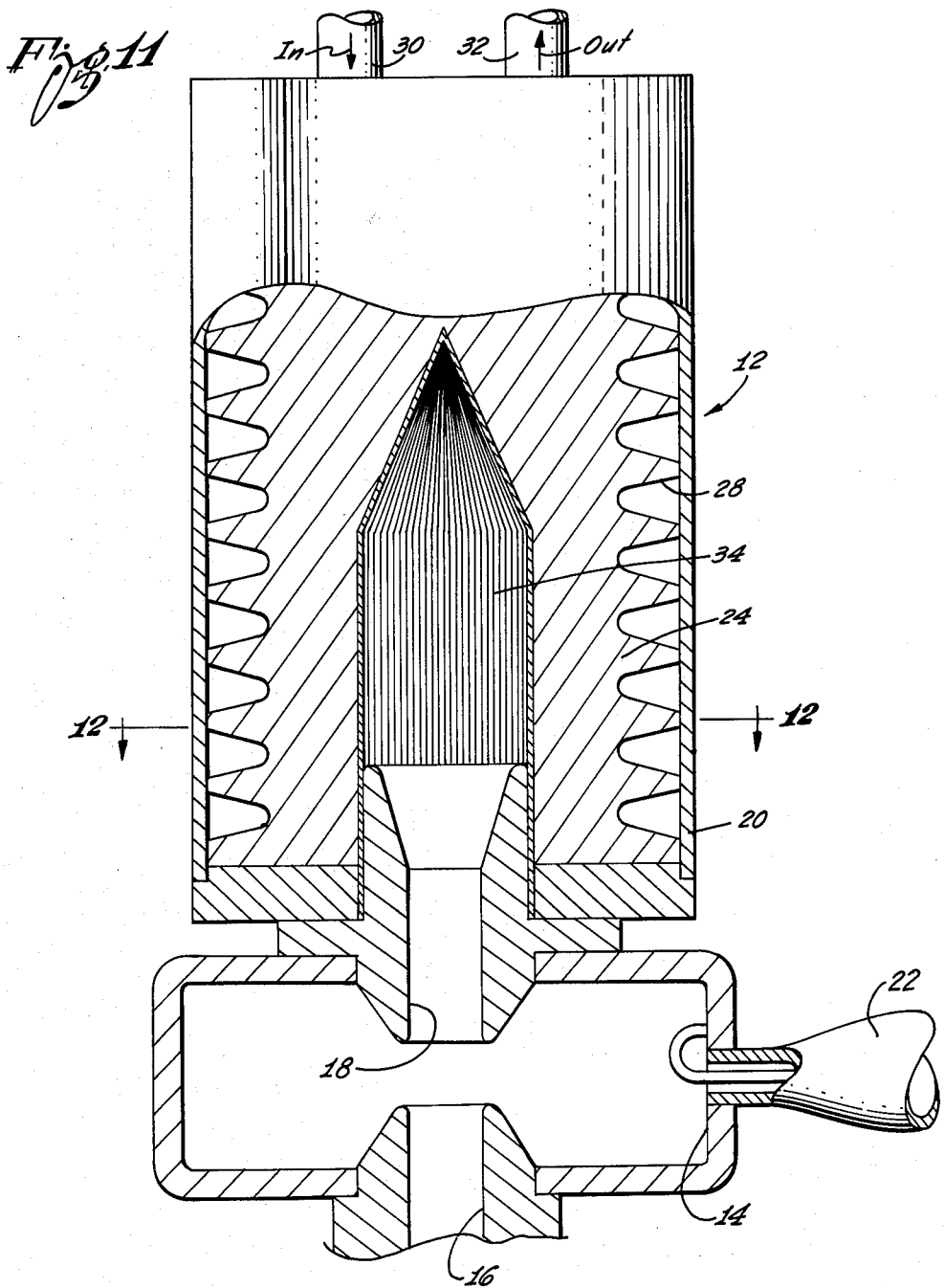

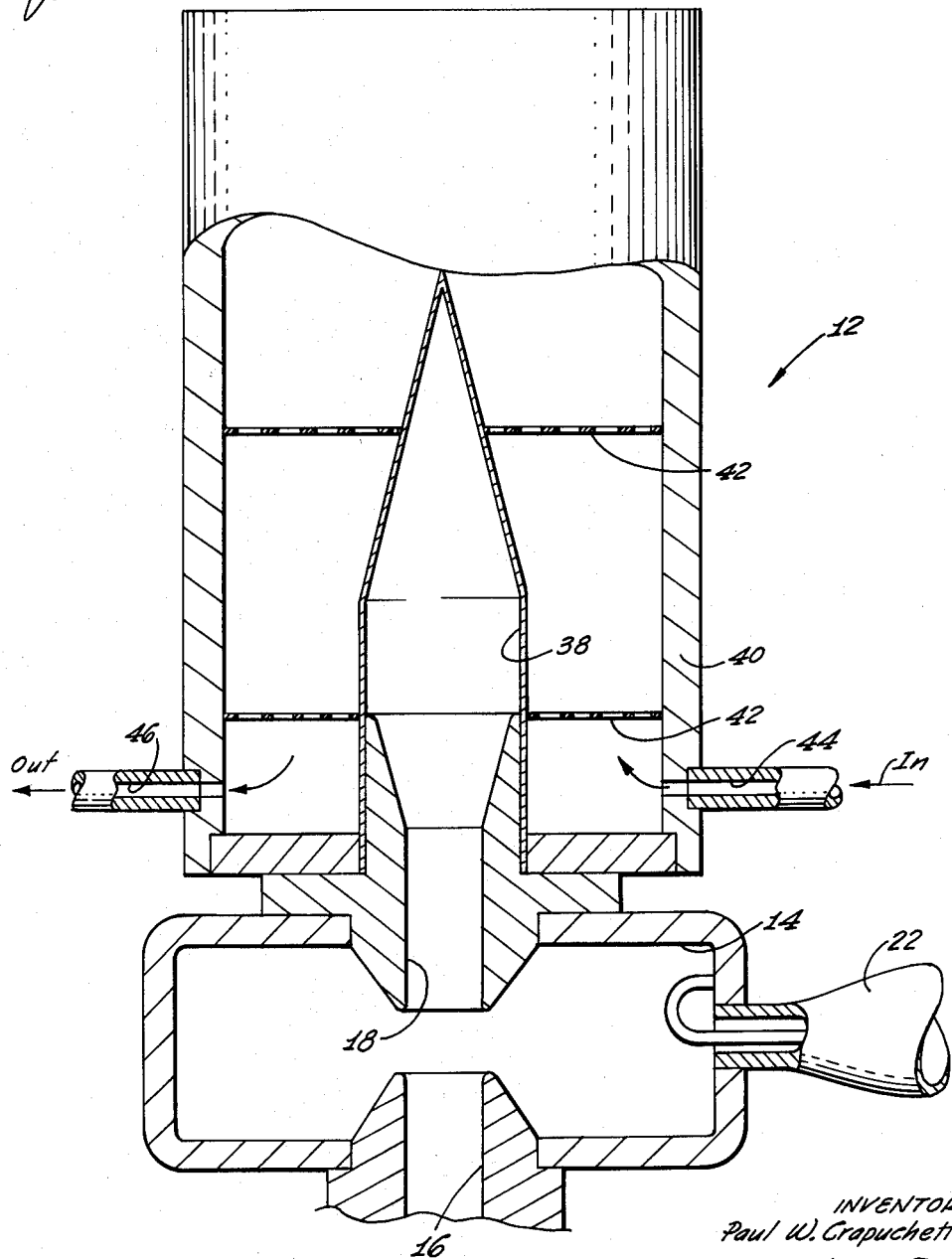

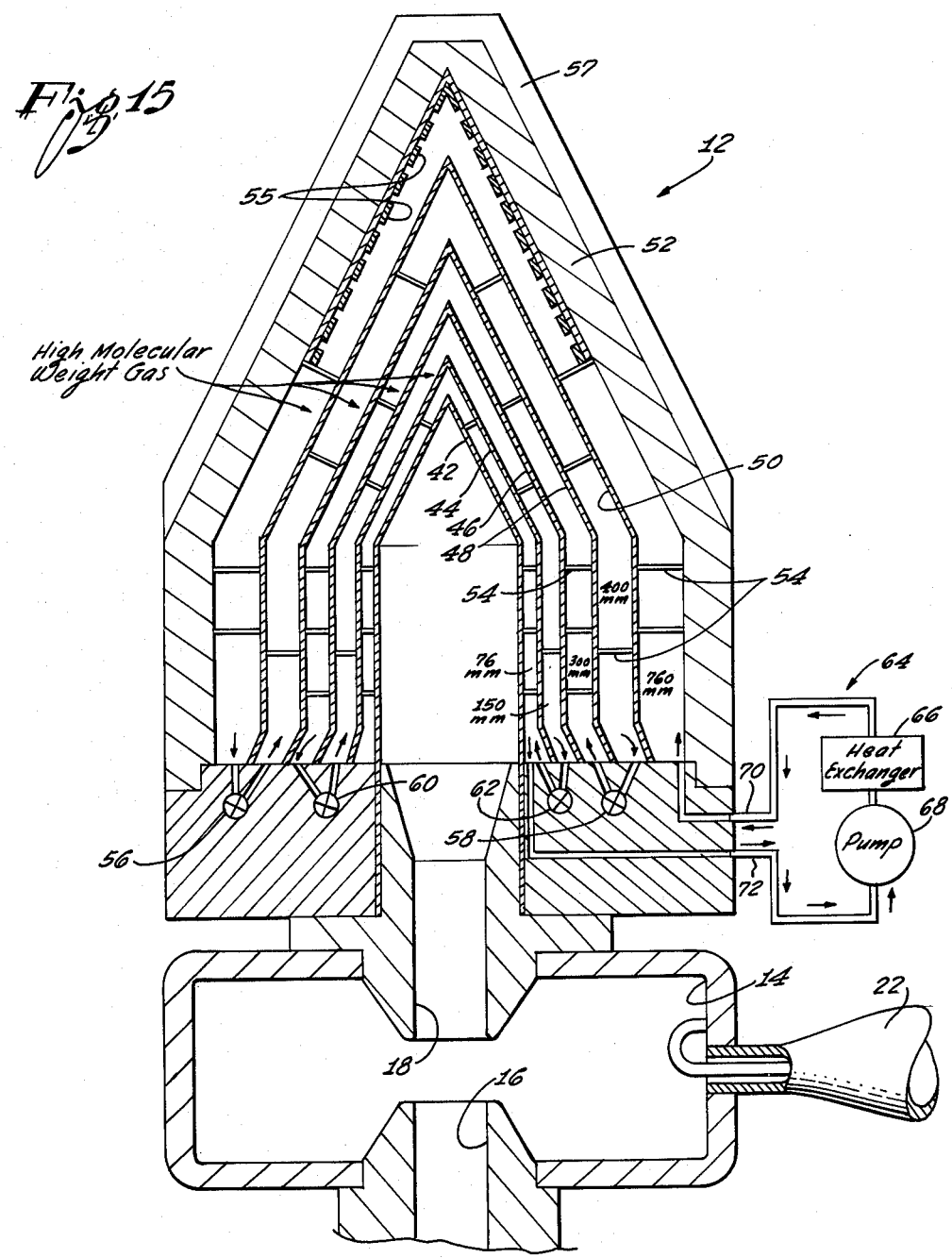

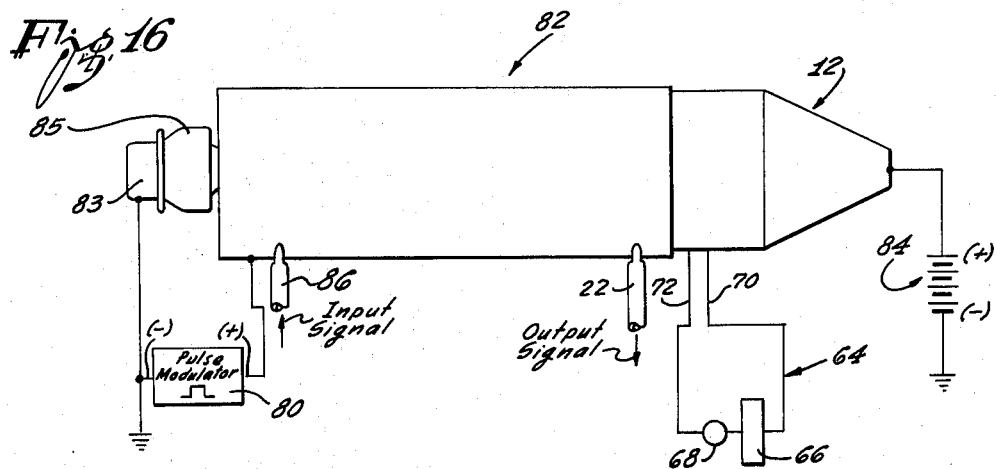
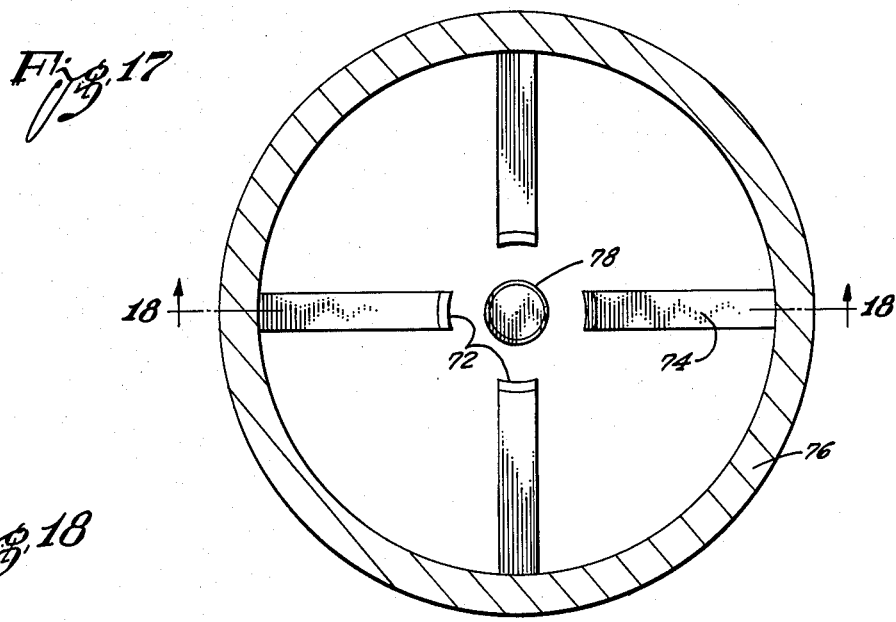
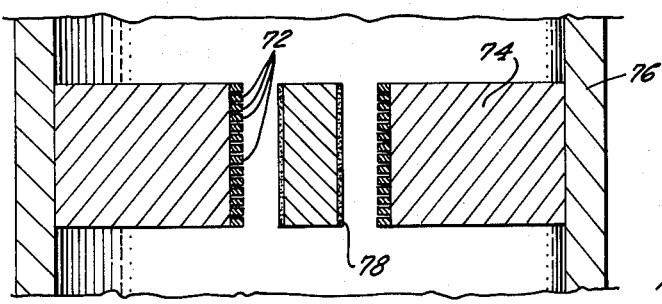

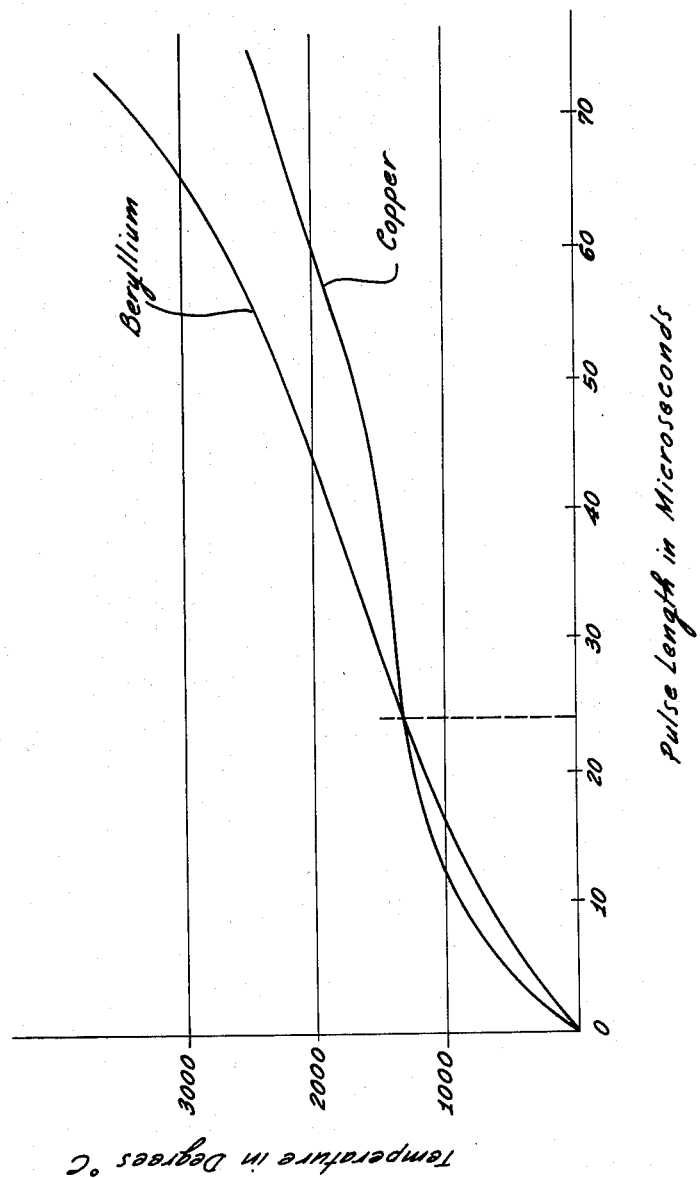

United States Patent Office 3,260,885
Patented July 12, 1966

3,260,885
ANODE STRUCTURES PROVIDING IMPROVED COOLING FOR ELECTRON DISCHARGE DEVICES
Paul W. Crapuchettes, Atherton, Calif., assignor to Litton Precision Products, Inc., a corporation of Delaware
Filed Sept. 26, 1961, Ser. No. 140,783
7 Claims. (Cl. 315—5.38)

This invention relates to anode structures for electron discharge devices, and more particularly to improved anode structures which are capable of withstanding high temperatures and high temperature gradients resulting from pulsed high current electron beams impinging on the surface of such anode structures.

In the prior art, many forms of anode structures have been proposed to solve the problem of heat transfer and secondary electron emission in high power electron tubes. The various proposals have included tapering the inner surface of the anode to spread or fan out the beam over a large surface area to thereby prevent the electrons from being concentrated on a small area of the anode; providing the main body of the anode with passages or ducts through which a circulating fluid is passed to absorb heat from the anode and carry it away in passing therefrom; and providing the main anode body with external fins to radiate the heat from the body. Forced air is generally used with the finned arrangement to increase the amount of heat dissipated. Still other proposals have included coating the inner anode surface facing the electron beam with an electron inhibiting material to eliminate secondary emission, or providing the main anode body with vane elements facing the electron beam which tends to spread the beam over a large surface area to prevent the electrons from being concentrated in a relatively small area of the anode.

The inability of these prior art anode forms to provide satisfactory heat transfer characteristics has been evidenced by melting, cracking and flaking of the surface of the anode facing the electron beam. Destruction of the anode surface in the examples cited hereinabove apparently arises from improper selection of materials capable of dissipating heat generated therein. In addition, the configuration of the inner surface facing the beam or the heat absorbing arrangement on the side of the electron intercepting surface away from the electron beam has been inadequate to permit the heat generated in the anode to be removed fast enough to eliminate destruction thereof.

For example, when a relatively high current electron beam is utilized, a relatively long anode body would be required to provide a tapered surface sufficient to spread the beam enough to avoid melting the surface upon which the electrons impinge. A relatively long anode structure is objectionable because it makes the over-all length of the tube unwieldly and heavy. Notwithstanding the fact that the beam may be spread over a large surface area, there still exists an electron concentration area at the apex of the anode's tapered structure. This is especially true when the tapered surface of the anode is conical. Thus, in the final analysis, the problem may be one of removing the heat from the exposed surface layer of the anode.

As discussed briefly hereinabove, the heat has traditionally been removed by fluid cooling or forced air cooling. These arrangements have proven inadequate when unusually high current density electron beams are employed because they are limited to the characteristics of the materials utilized for the anode body, such as copper for example, and the cooling fluid, such as water for example. It is well known that copper is a relatively good heat conductor and may be cooled by putting a cooling fluid in contact with the surface away from the electron beam. Thus, the ability to remove heat from the copper is dependent upon the type of cooling fluid employed and the volume of fluid in contact with the anode's surface for a given period of time. To meet this requirement, the size of the arrangement necessary to accommodate enough cooling fluid to accomplish the heat transfer may be prohibitive from a size, weight and cost point of view.

Assuming that the size, weight and cost of an anode body and cooling arrangement are acceptable, the problems of cracking of the surface facing the electron beam and the resultant outgassing, which account for a major portion of the failures of high power tubes, still remain. It has been found that the surface of high power electron tubes fail in fatigue, that is, these surfaces become cracked, flake off and give off gases trapped within the metal body of the anode when subjected to alternating thermal stresses produced by unusually high peak current pulses from the electron beam. Failure of the anode due to thermal fatigue may readily occur under conditions which do not cause actual melting of the anode surface.

Continuing with the discussion of thermal fatigue, it has been found that certain materials traditionally utilized for anode structures, such as copper for example, are highly susceptible to thermal fatigue. On the other hand, it has been found that certain other materials may be used in combination with copper which are resistant to such thermal fatigue. For the most successful results, it has been determined that the materials which are employed should have a preselected configuration and thickness.

In accordance with one aspect of the present invention, the foregoing and other disadvantages of the prior art are obviated by providing anode structures whose inner surfaces resist melting, flaking or cracking when subjected to high temperatures produced by unusually high current density electron beams. According to an illustrative embodiment of the invention, there is provided a composite anode structure wherein the inner surface facing the beam is of a protective material capable of withstanding extremely high peak temperatures caused by electrons impinging thereon.

More particularly, in accordance with this aspect of the invention, there is provided a composite anode structure comprising a massive conductive main body having a protective inner surface of a low atomic weight material, such as beryllium, facing the electron beam. The thickness of the layer of beryllium may be from one-half to five times, and is preferably about twice the penetration depth of the electrons in beryllium at a predetermined electron velocity. In this embodiment, the thickness of the laminated layer of beryllium is chosen to prevent high peak temperature build-up at the inner surface and to substantially reduce or eliminate secondary electron emission. It has been found that certain low atomic weight materials, such as beryllium, permit high speed electrons to penetrate into these materials to a greater extent than with copper and therefore inhibit surface temperature and stress build-up. In addition, the high heat capacity of beryllium is helpful in avoiding high peak temperatures. Elimination of the high peak temperature build-up in turn eliminates melting, cracking or flaking of the material. The good mechanical properties of beryllium as contrasted with those of copper also contribute to the reduction of mechanical failure.

Although it is recognized that beryllium has been employed for certain experimental purposes as a target for charged particles, such experimental use has not suggested the use of beryllium or other similar coatings for the protection of anodes under high heat dissipation conditions. Thus, for example, the present applications contemplate the dissipation of at least $10^6$ watts per square inch of surface area, at a duty cycle greater than 0.001.

In accordance with another aspect of the invention, the heat absorption properties of an anode may be greatly increased by providing cuts in the surface of the anode facing the beam. These cuts may be in the form of a grid running in two directions. Mechanical stresses produced by high thermal gradients can be readily absorbed by this form of construction.

In accordance with another aspect of the invention, an anode is provided which includes several metallic membranes defining successive chambers of progressively increasing gas pressure. The membranes are relatively thin to permit transmission of electrons, and circulating gas absorbs the electrons and dissipates the resultant heat. The successive chambers avoid the application of unduly high pressures on the thin metallic membranes.

In a modified version of the embodiment, there is provided a massive conductive main anode body with thin strips of beryllium on the surface facing the electron beam. These strips of beryllium are relatively thin, such as 0.30 inch, and spaced very close together on the order of 0.20 inch. The height of the strips is determined by the predetermined velocity of the electrons in the beam of the device as discussed hereinabove.

In accordance with a further embodiment of the invention, there is provided a form of anode structure wherein the inner surface facing the electron beam is a thin tapered cylinder of beryllium which is cooled by a high velocity high atomic weight fluid, such as a gas for example, in contact with the cylinder on the side away from the electron beam. In this embodiment, the peak temperatures customarily associated with the collector are eliminated by direct gas absorption of the beam energy, since the beryllium is transparent in the beam.

A composite anode utilizing the various features set forth above may also be provided. More specifically, a thin layer of beryllium may be provided with a grid of slots and may be mounted on a massive copper anode. One or more additional thin surfaces of beryllium may be mounted in front of the laminated anode to define additional changes. Gas of a high molecular number may be circulated at progressive pressure levels in these additional chambers. Through the use of this structure, the advantages of several of the embodiments of the invention discussed above may be incorporated into a single anode arrangement.

It is, therefore, an object of the invention to provide an improved anode structure for an electron device where the surface facing an electron beam has a protective material covering which is capable of withstanding relatively high temperatures.

It is another object of the invention to provide an improved anode structure having an electron device having a protective inner surface facing an electron beam which will resist melting, cracking or flaking when subjected to thermal stress of a high temperature cycle produced by the electron beam.

A further objective of the invention is to provide an improved anode structure for an electron device wherein the massive heat conducting body of the anode structure absorbs heat generated by an electron beam passing through the protective inner surface facing the electron beam.

Still another object of the invention is to provide an improved anode structure for an electron discharge device wherein the absorption properties of a high velocity gas having a high molecular weight is utilized to absorb heat generated by electrons passing through the inner protective surface of the structure facing the electron beam of the device.

The novel features which are believed to be characteristic of the invention both as to its organization and method of operation, together with further objects and advantages thereof, will be better understood from the following description considered in connection with the accompanying drawings in which several embodiments of the invention are illustrated by way of example. It is to be expressly understood, however, that the drawings are for purpose of illustration and description only, and are not intended as a definition of the limits of the invention.

FIGURE 2 shows a family of design curves plotting temperature against time for the surface and other points within the surface of a semi-infinite body;

FIGURE 9 is a diagrammatic view, partly in cross-section, of a high current electron beam device, illustrating the manner in which the inner surface of an anode structure may be covered with a layer of beryllium in accordance with the invention;

FIGURE 10 is a cross-section view of the anode of the device, taken along line 10—10 of FIGURE 9, illustrating the relative size of the main anode body and the inner surface covering;

FIGURE 11 is a diagrammatic view, partly in cross-section, of an alternative form of inner surface covering for the anode according to the invention;

FIGURE 12 is a cross-section view of the anode of the device shown in FIGURE 11, taken along line 12—12 of FIGURE 11;

FIGURE 13 is a fragmentary cross-section view of the anode, taken along line 13—13 of FIGURE 12, illustrating the manner in which strips of beryllium may be connected to the inner surface of the main anode body and extend radially toward a remote center;

FIGURE 14 is a diagrammatic view, partly in cross-section of another embodiment of the anode structure of the invention, illustrating the manner in which a thin tapered cylinder of beryllium is cooled by a high velocity high atomic weight fluid;

FIGURE 15 is a diagrammatic view partly in cross-section of still another embodiment of the anode structure of the invention, illustrating the manner in which a series of graded pressure chambers are arranged to circulate a fluid to cool a plurality of concentric beryllium membranes;

FIGURE 16 is a circuit diagram illustrating the use of a pulse modulator, in the form of a block diagram, for pulsing the electron beam of the klystron;

FIGURE 17 is a diagrammatic view of yet another embodiment of the invention, illustrating the manner in which strips of beryllium may be utilized on the vane tips of a magnetron anode structure in accordance with the invention;

Figure 1:
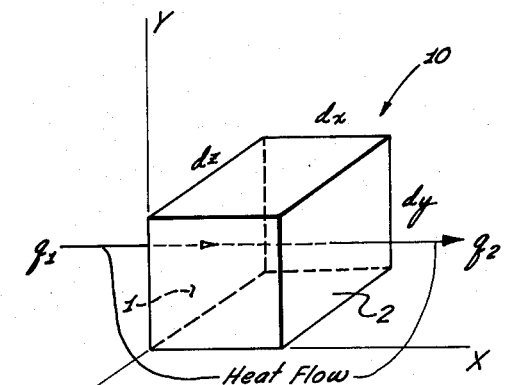
FIGURE 1 represents a differential volume of material illustrating the heat flow into the material and that leaving the volume, wherein the difference in the two represents the energy stored.

FIGURE 18 is a cross-section view of the magnetron anode structure, taken along line 18—18 of FIGURE 17, illustrating the manner in which the beryllium is affixed to the vanes of the anode adjacent the interaction space; and FIGURE 19 is a plot of the temperature rise versus pulse length for beryllium and copper when exposed to a 200 kilovolt electron beam of $10^6$ watts per inch square intensity.

The invention will be better understood by considering an analysis of the procedure for designing an anode structure in accordance with several embodiments of the invention. This analysis will cover the solutions of several general cases, namely; heat input to a semi-infinite anode, heat supplied to a preselected depth within the inner surface of the body, heat developed within a thin body and the associated cooling arrangements, heating a relatively thick anode member to establish a criteria for selecting the proper thickness therefor, and heating an anode with sequential pulses.

In the foregoing equations and in the discussion which follows, the following symbols are employed.

A: arbitrary constant
$A_n$: arbitrary coefficient
$A_o$: arbitrary constant
$\alpha$: time measured in units of ($t=\alpha\tau$)
b: thermal expansion coefficient, in./in./° C.
$B_n$: arbitrary coefficient
Cp: heat capacity, watt-seconds/gram
d: pulse duty ($\tau \times$ repetition rate)
E: modulus of elasticity, #/in.²
$\epsilon$: thermal expansion coefficient and temperature
$\gamma$: phase angle of arrival of heat at outer boundary relative to the arrival of the crest of the fundamental
h: convection heat transfer coefficient at the outer boundary, w./in.²/° C.
K: thermal conductivity, watts/in.²/° C./in.
k: diffusivity
m: 1/$\sigma$
$\omega$: angular frequency, radians per second
p: penetration depth of electrons, inch
$\phi$: dimensionless distance parameter, $$\frac{X}{2\sqrt{k}}$$

q: intensity of heat flux, peak, watts/in.²
$q_1$: intensity heat flux flowing into a surface of a body facing the impinging electron beam, peak watts per square inch
$q_2$: intensity heat flux flowing out of a surface of a body away from the impinging electron beam, peak watts per square inch
$q_n$: Fourier components of heat pulse
$q_o'$: peak heat flux captured by anodes from penetrating electrons, per unit area, w./in.²
$q_{oo}$: average heat flux, watts./in.²
$\rho$: specific gravity × 16.39
S: fibre stress, #/in.²
Sp. gr.: specific gravity
Sy: fibre stress at yield point
$\sigma$: Poisson's ratio t: time, seconds
T: temperature, ° C.
ΔT: temperature difference of hot spot from body temperature
$T_{e\tau}$: temperature at distance $l@t=\tau$
$T_{o\tau}$: temperature of inner boundary @ $t=\tau$
$\tau$: pulse length, seconds
l: thickness of anode
x: variable for depth
$X_o$: side of anode over which most of gradient exists

TABLE I

Thermal properties of copper and beryllium in the temperature range 0–600° C.:

| Material | Thermal Conductivity K, w./in./° C./in. | Capacity Cp, Joules/gm. | Specific Gravity, Sp. gr., gm./cm.³ | Diffusivity k* | $k^{1/2}K^{-1}$ | Thermal Expansion Coefficient |
|---|---|---|---|---|---|---|
| Be(beryllium) | 1.50 | 2.72 | 1.85 | 0.76 | .585 | 8.0×10⁻⁶ |
| Cu(copper) | 9.8 | .392 | 8.94 | 7.1 | .265 | 17.6×10⁻⁶ |

$$*k = \frac{2.5 \times K}{Cp \times sp. \, gr.}$$

Referring to FIGURE 1, there is shown a cube generally designated 10 which represents a differential volume of material having the dimensions dx, dy, dz, respectively, along the mutually perpendicular axis x, y, and z. The heat flow into face 1 or the input heat $q_1$ is represented by the equation $$q_1 = Kdydz \frac{\partial T}{\partial x}\bigg|_1 \quad (1)$$

and the heat flow out of face 2 or the output heat $q_2$ is represented by the equation $$q_2 = -Kdydz\left(\frac{\partial T}{\partial_x} + \frac{\partial^2 T}{\partial_x^2}\right)dx \quad (2)$$

The difference between the input heat ($q_1$) and the output heat ($q_2$) represents stored energy which is given by the equation $$q_1 - q_2 = Cp \, dxdydx \frac{dT}{dt} \quad (3)$$

whence we have the equation $$\frac{K\partial^2 T}{\partial_x^2} = Cp\rho \frac{\partial T}{\partial t} \text{ or } \frac{k\partial^2 T}{\partial_x^2} = \frac{\partial T}{\partial t} \quad (4)$$

Solutions to these partial differential equations are numerous. Any solutions which fit the same boundary conditions will yield the same results, but at each boundary certain forms of solutions are more tractable than others. Thus, in view of the transcendental nature of the problem, various solutions are prepared for each boundary.

*Case 1.—Semi-infinite solid*

This example concerns a semi-infinite solid with heat flow into a face at $x=0$. Heat flux for a single pulse is 0 when $t=0$ and q for $0<t<\tau$ and $q=0$ for $\tau<t<\infty$. The differential Equation 4 is satisfied by an error function solution which very conveniently describes conditions at the input and throughout the body. Thus, $$T = \frac{2q_o}{K}\sqrt{\alpha k\tau} \, \text{ierfc} \, \frac{\phi_o}{\sqrt{\alpha}} \text{ for } 0<\alpha<1 \quad (5)$$

and $$T = \frac{2q\sqrt{\alpha K\tau}}{K}\left(\sqrt{\alpha} \, \text{ierfc} \, \frac{\phi_o}{\sqrt{\alpha}} - \sqrt{\alpha-1} \, \text{ierfc} \, \frac{\phi_o}{\sqrt{\alpha-1}}\right) \quad (6)$$

where: $1<\tau<\infty$ and $$\phi_o = \frac{x}{2\sqrt{k\tau}} \quad (6a)$$

The dimensionless variables defined herein have been introduced to permit plotting a family of design curves which are shown in FIGURE 2. The special case of $\alpha=1$ is of importance since the temperature is maximum on the skin at that time. Thus, with reference to FIGURE 2, the upper curve is a function of the temperature at the surface of the anode, and the other curves are at points within the surface. The maximum temperature appears at the end of a pulse, corresponding to a value of $\alpha=1$, at the left hand edge of FIGURE 2. At $X=0$ and $\tau=1$ the Equations 5 and 6 reduce to $$T_{or} = \frac{2q_o}{K}\sqrt{\frac{k\tau}{\pi}} \qquad (7)$$

*Case 2.—Electron penetration to a preselected depth*

In this case, the electrons penetrate the surface of the semi-infinite solid to a depth $p$ and produce uniform heating throughout the solid to that depth. Since the electrons are penetrating the surface, the thermal gradient at that point is zero and becomes a maximum at the depth of penetration $p$. The added mass or heat capacity at the input face integrates the energy, and peak pulse temperatures are reduced. The differential equations need be modified by the addition of a term which adds to the energy stored by heat transfer the amount which is directly introduced into the differential element, $A_0\, dxdydz$. The differential Equation 4 thus becomes $$Cp\,\rho\frac{\partial T}{\partial t} = \frac{K\partial^2 T}{\partial_x^2} A \qquad (8)$$

A solution to this equation at the inner face, in terms of temperature valid during the pulse interval, that is when $X=0$, is $$T_o = \frac{2kq\tau}{pK}\left(1 - 4\text{ ierfc}^2\frac{p}{2\sqrt{k\tau}}\right) \qquad (9)$$

and $$\left.\frac{\partial T}{\partial_x}\right|_{x=p} = \frac{qk\tau}{Kp}\left(.5643\frac{p}{\sqrt{k\tau}}\right) \qquad (10)$$

The temperature distribution throughout the body is not significantly different from that of Case 1 discussed above at distances beyond five times the penetration depth into the metal, and for $\alpha>1$ throughout the metal, so that additional soultions are not deemed necessary. Design curves have been calculated from these equations, and are shown in FIGURE 3.

Figure 3:
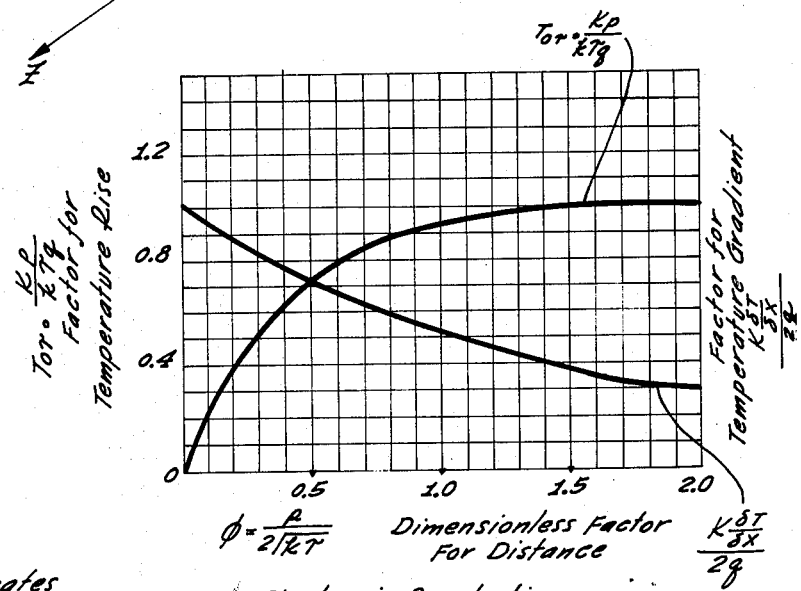
FIGURE 3 shows two factors for temperature rise and temperature gradient plotted against a dimensionless factor for distance, which are useful in utilizing the principles of the present invention.
Figure 4:
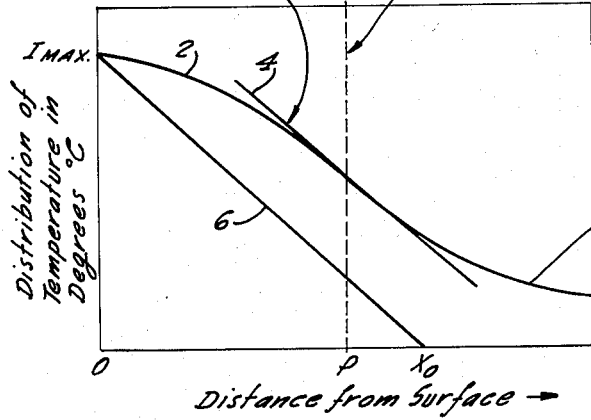
FIGURE 4 is a plot of the temperature distribution near the surface versus the depth of penetration of the electron beam.

The thickness of the plate subjected to thermal stresses can be adequately approximated using the curves shown in FIGURE 3. The curve 2 in FIGURE 4 shows the temperature distribution starting at $T_{max}$ on the surface of the body. The line 4 is the tangent to the curve 2 and indicates the maximum temperature gradient, which occurs at a depth $p$ equal to the electron penetration depth. As the mechanical stress is proportional to the temperature gradient, and the surface layer to the left of $p$ in FIGURE 4 is subject to stresses from within the body, it is useful, for analysis purposes, to draw a line 6 through $T_{max}$ parallel to line 4. The indicated approximate thickness $X_o$ of the plate subject to thermal stress is of the proper order of magnitude. As shown in FIGURE 2, the wave front of the heat impulse is very steep when $\tau=1$. Thus, as shown in FIGURE 4

$$\frac{T_{max}}{X_o} = \left.\frac{\partial T}{\partial x}\right|_{x=p} \qquad (11)$$

when "$X_o$" is of proper magnitude.

*Case 3.—Thin body bound by two parallel planes*

Anodes having the electrons penetrating clear through them are subjected to uniform heating throughout. At the inner surface there is no heat flow and the outer surface must be cooled.

A typical solution to Equation 8, which is applicable to this case, is set forth below. In this solution, it is assumed that heat is flowing out the surfaces $X=0$ and $X=l$. If the region $X=l/2$ to $l$ is used there will be no heat transfer across the middle plane of symmetry and our boundary conditions are met during the pulse period. Use of this image method gives the following equation $$T = \frac{A_0}{2K}\Bigg\{x(l-x) - \frac{8l^2}{\pi^3}\sum_{n=0}^{\infty}\frac{1}{(2n+1)^3}e^{-\frac{kt}{l^2}(2nl/l)^2\pi^2}\sin(2n+1)\frac{\pi x}{l}\Bigg\} \qquad (12)$$

By differentiation, then substituting $x=l$ the heat flux into the sink at $x=l$ is:

$$q_1 = \frac{A_0 l}{2}\Bigg\{1 - \frac{8}{\pi^2}\sum_{n=0}^{\infty}\frac{1}{(2n+1)^2}e^{-\frac{kt}{l^2}(2n+1)^2\pi^2}\Bigg\} \qquad (13)$$

or $$q_1 = q_o'\Bigg\{1 - .81\sum e^{-\frac{k\tau}{l^2_x}9.86} + \frac{e^{-\frac{k\tau}{l^2_x}88.5}}{9} + \frac{e^{-\frac{k\tau}{l^2_x}246}}{25} + \cdots\Bigg\} \qquad (14)$$

where $q_o$ is the peak heat energy captured in a unit area of the anode and $q=0$ at $x=l/1$. At the plane $l/2$, corresponding to our inner anode surface it is found that $$T_o = \frac{q_o' l}{4K}\Bigg\{1 - \frac{2}{\pi^3}\sum_{n=0}^{\infty}\frac{(-1)^n}{(2n+1)^3}e^{-\frac{k\tau}{l^2}(2n+1)^2\pi^2}\Bigg\} \qquad (15)$$

By inspection it is seen from the Equations 14 and 15 that both the above series terms are rapidly convergent for small values of $l$. Thus, for a close approximation $$T_o = \frac{q_{o1}'}{4K} \qquad (16)$$

$$q_x = l = q_o \qquad (17)$$

and the problem becomes one of boundary design.

Under these conditions, it is not likely that the general assumption that the boundary can be made to look like a continuation of the conducting material will be valid so that the temperature will rise above the value shown in Equation 17. If it is assumed that the thin shell will uniformly rise in temperature due to the thermal resistance to heat exchange at the outer wall, a correction for the boundary can be made. At the boundary $$q = hT + \rho lCp\frac{\partial T}{\partial t} \qquad (18)$$

in which the terms represent transfer into the fluid and storage in the anode and interface film. A solution of this differential equation is $$T = \frac{q_o}{h}\left(1 - e^{-\frac{h\tau}{\rho lCp}}\right) \qquad (19)$$

Thus, the total rise in temperature at the end of the pulse is $$T_o = \frac{q_{o1}'}{4K} + \frac{q_o'}{h}\left(1 - e^{-\frac{h\tau}{\rho lCp}}\right) \qquad (20)$$

*Case 4.—Establishment of a crieteria for selecting proper thickness*

The case of a relatively thick anode used as a ripple filter to prevent vapor lock blockage caused by the formation of steam in the water cooling jacket for example at the exchange boundary, will now be considered. It will be appreciated that there may be an infinite number of solutions to a differential equation which fit all the boundary conditions of this case, but which converge more or less rapidly and thus can have varying degrees of engineering significance. It has been found that the condition at the exchange boundary is best represented by a solution in terms of the Fourier components of the input pulse, from which the following equation is derived $$q = \sum_{n=0}^{\infty} q_n \sin nwt \quad (21)$$

where $$q_n = 2q_{ave} \frac{\sin n\pi d}{n\pi d} \text{ and } q_{ave} = qd$$

Thus, it may be shown that the differential equation is also satisfied by the equation $$T = A_o x + \sum_{n=1}^{\infty} A_n e^{-\frac{nw x}{2k}} \sin\left(nwt - x\frac{nw}{2k}\right) + B_n e^{-x\frac{nw}{2k}} \cos\left(nwt - x\frac{nw}{2k}\right) \quad (22)$$

where the values of $A_n$ and $B_n$ can be obtained by differentiating Equation 22 with respect to $x$ and matching term for term when $x=0$. Since $q$ contains no cosine terms, it is found that $$A_n = -B_n = \frac{qn}{2K}\sqrt{\frac{2k}{nw}} \quad (23)$$

and then $$T_o = \frac{A_o X}{K} + \sum_{n=1}^{\infty} \frac{qn}{2K}\sqrt{\frac{2k}{nw}} e^{-x\frac{nw}{2k}} (\sin \theta_n - \cos \theta_n) \quad (24)$$

and $$q = A_o + \sum_{n=1}^{\infty} q_n e^{-x\frac{nw}{2k}} \sin \theta_n \quad (25)$$

in which $$\theta_n = \left(nwt - x\frac{nw}{2k}\right) \quad (26)$$

By inspection of the foregoing equations, it may be seen that the velocity of the wave of constant $\theta$ is $$v = \sqrt{2nkw} \quad (27)$$

and that $$\frac{T_n}{q_n} = \frac{1}{K}\sqrt{\frac{2k}{nw}}(1-j) \quad (28)$$

in which the real term describes the heat carried away by conduction and the imaginary term describes the heat passing through the boundary destined to be stored in the heat capacity. Any boundary which represents continuity in $T_n/q_n$ will be reflectionless for that harmonic.

As this complex wave of heat passes through the materials which may be utilized, the high frequency components ($n>l$) attenuate more rapidly. Since, in usual high power tube design, the designer is as much limited by handling the heat exchange problem as by the pulse temperature problem, it is felt that the wave of heat should be almost completely attenuated when it arrives at the cooled boundary or the boundary will vapor lock and reflections taking place there will return to the anode face and cause its temperature to be higher than that given by Cases 1, 2 or 3. The time of arrival of the crest of the fundamental may be determined by equation $$t = \frac{l}{w}\sqrt{\frac{w}{2k}} \quad (29)$$

Simultaneously, the crest of the higher harmonics have advanced in phase by $$(n-1)\sqrt{\frac{nw}{2k}} \quad (30)$$

as can be developed from Equation 24 and the input conditions. Summation of all fluctuating heat flow at the outer boundary is needed to determine peak values of heat to be transferred at the surface, thus $$R = \frac{1}{q_o} \sum_{n=1}^{\infty} \frac{2 \sin n\pi d}{n\pi d} e^{-l\sqrt{\frac{nw}{2k}}} \cos\left\{\gamma + \sqrt{\frac{nw}{2k}}(n-1)\right\} \quad (31)$$

in which $\gamma$ is the phase of the peak fluctuation at the output compared with the crest of the fundamental fluctuation. Since the waves attenuate rapidly when $l$ is large $\gamma$ is approximately zero and curves as in FIGURE 5 can be prepared. When the anode is thin ($l$ small) an individual summation must be made assuming various $\gamma$ to obtain the real peak amplitude since ordinary maximizing procedures are hopelessly complex.

*Case 5.—Repetitious pulses applied to the inner surface*

This case is a modification of the above solutions to accommodate repetitious pulses and/or cylindrical geometry. There was an assumption made in Case 4 that a series of pulses were producing the heat in the anode, not just one. In Case 3, it is found that a thin anode is essentially time invariant and that therefore each pulse is completely removed from storage before another arrives. Since the differential equations are linear, a steady state solution can be superposed on the transient solution directly so that the zero or ground state temperature is everywhere in the body given by the correction term $$T = \frac{qd}{K}x \quad (32)$$

where $x$ is the distance from the outer boundary.

Since these pulse temperatures exist in only thin films, the temperature gradients are high and the peak values do not need correction when the gemoetry is non-planar. The average heat flow term can be approximately corrected when in cylindrical geometry by the factor $$\left(1 + \frac{\Delta r}{r}\right)^{-1} \quad (33)$$

THERMALLY INDUCED STRESSES

Thermal stresses develop or are induced in materials when they are confined, and thus cannot expand as they normally would at the elevated temperature. In cylindrical geometry successive annuli will not encounter shear at their faces due to the circular symmetry. The inner face is free to grow inwardly. Assuming that the stress added to the inner ring by the growth of those outside it to be small, a differential element can be drawn from the ring as a free body and examined. This assumption is not entirely valid, but corrections may be made later. The body is then free to expand in the radial direction but is confined on all four other faces. The tendency is for each face to expand by an amount $\epsilon = bT$. Studying the forces required to push the cube back to its original $x$ and $y$ dimensions tells us what the thermal stresses are along the $x$ and $y$ axis $$\frac{S_x}{\Delta T} = \frac{S_y}{\Delta T} = \frac{bE}{1-\sigma} \quad (34)$$

where $\Delta T$ is the temperature difference (hot to cold) in the body. These compressive forces are parallel to the surface.

In order to determine if slots in the face of the metal will prevent stress cracking, consider a thin slice, $X_o$ thickness. If a steady flow of heat is passing between top and bottom of the resulting plate it is found that the plate has become a sphere whose attempted radius is given by $$r = \frac{1}{b\frac{\partial T}{\partial x}} \quad (35)$$

Figure 6:
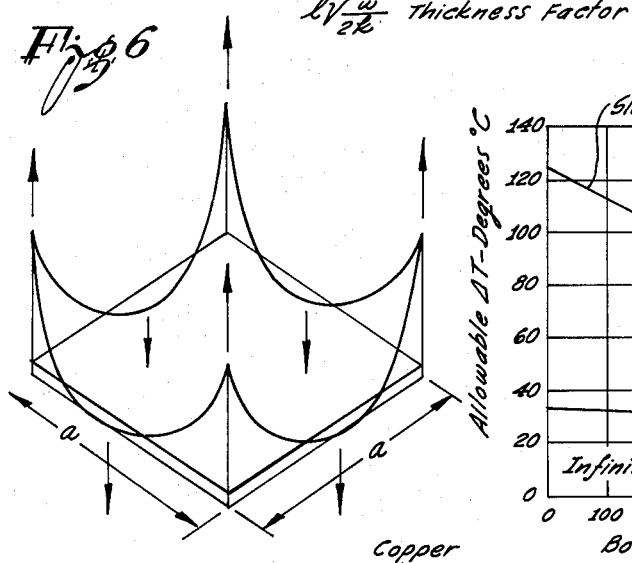
FIGURE 6 illustrates the stress forces acting upon a section of an anode which is subjected to a steady flow of heat passing between its top and bottom surfaces.

When forces are applied to straighten out the curved plate, the stress caused by thermal gradient in a constrained body is reproduced. These stresses are undoubtedly of the form shown in FIGURE 6. An approximation of the reduction of the stress strain loading on a flat plate due to slicing is obtained when one assumes the edge support and uniform load over the circle $d=.6a$, where "$a$" is the rectangular dimension of the flat plate shown in FIGURE 6 or the periodicity of the slot. The stress may be determined by the equation $$S_{max} = \frac{1.14mEX_o}{(m^2-1)r} \quad (36)$$

where $$m = \frac{1}{\sigma}$$

which applies uniformly whenever $0 < a < 0.5r$. For larger "$a$" the solution asymptotes on Equation 34. If the relation between temperature, temperature gradients and temperature coefficients presented in Equations 11 and 35 are combined 36 becomes $$\frac{S}{T} = \frac{1.14mbE}{m^2-1} \quad (37)$$

The slots should cut into the metal until the temperature rise in the remaining metal is not enough to cause stress cracks at the bottom of the slot.

The properties of materials are rapidly varying functions of temperature in part of the region of interest. To avoid over-stressing the material it is well for the designer to prepare curves of $Syp$, $b$, $E$, and $\sigma$ vs. temperature and from them plot a curve of allowable $\Delta T$ vs. temperature. See FIGURE 7 for typical curves for copper. The peak temperature determined from calculation must be consistent with the value from FIGURE 7 or stress cracking will take place and the size of the cracked islands can be determined from Equation 35. Note the 3:1 improvement which results from the grid of slots.

DESIGN PROCEDURE

Since many considerations determine the adequacy of a design, and no analytical expression is related to them, the design of a particular structure takes the form of successive approximations approaching the desired result. Thus, a typical design procedure may be commenced by the selection of a beam voltage from which the beam penetration of a given material may be determined by reference to an applicable plot of electron peneration versus electron beam voltage. FIGURE 8 is such a plot for copper and beryllium. Next, using the value of electron beam penetration and the density of the material under consideration, the depth of penetration into the material may be determined. Then, using the diffusivity constant, pulse length, beam penetration and FIGURE 3, it is possible to determine a dimensionless distance $\phi$ from which the temperature and temperature gradient due to the electron beam may be determined. Next, by assuming a percentage fluctuation between the ratio of the Fourier components of heat $q_n$ and average heat flux $q_{oo}$ for a particular duty cycle, a thickness factor $l$ may be determined from FIGURE 5 from which the anode thickness and average temperature rise of the anode may be determined. The average temperature rise is determined by using Equation 32. The peak temperature may be determined by adding the temperatures derived from using FIGURE 3 and Equation 32. The peak temperature may then be compared with the allowable temperature rise shown in FIGURE 7. In the instance when an unslotted surface is employed, the yielding stress is calculated from Equation 34. Finally, the slot periodicity may be determined by using Equation 35 to determine the attempted radius ($r$) and the value for the temperature gradient. The slot periodicity ($a$) is equal to $r/2$.

Compare this result with design goals from temperature, stress relief and slot periodicity (if used) and repeat to obtain an improved solution.

An example utilizing the foregoing design procedure is set forth below. A copper anode is bombarded with a 200 kilovolt beam at an intensity of $10^6$ watts per square inch. The pulse length is 7 microseconds and the repetition rate is 250 pulses per second. What is the peak temperature, the required slot periodicity and the minimum thickness of the anode?

The penetration of the beam into the copper is given by FIGURE 8 as 50 mg./cm.$^2$. From the data set forth hereinabove, the density of copper is 8940 mg./cm.$^3$ so that the beam penetrates .0021″ (50/8940 cm.) into the copper.

To determine temperature and temperature gradient from FIGURE 3, the following material properties and problem data are used:

Thermal expansion coefficient _____ $b = 17.6 \times 10^{-6}$ in./in./° C.
Thermal conductivity _____ $K = 9.8$ watts/in./° C./in.
Diffusivity _____ $k = 7.1$ $2.5 \times k/Cp \times$ sp. gr.
Pulse length _____ $\tau = 7 \times 10^{-6}$ second.
Peak intensity of heat flux __ $q = 10^6$ watts/in.$^2$.
Penetration depth of electron _____ $p = .0021$ inch.
Pulse duty _____ $d = .00175$ $\tau$ time repetition rate.

From these conditions $$\phi = \frac{p}{2\sqrt{k\tau}} = \frac{.0021}{2\sqrt{7.1 \times 7.10^{-6}}} = 0.153 \text{ (dimensionless distance)}$$

and from FIGURE 3 @ $\phi = 0.153$ $$\frac{TKp}{k\tau q} = .30$$

whence $$T = \frac{.30 \times 7.1 \times 7 \times 10^{-6} \times 10^6}{9.8 \times .0021} = 705°$$

and from FIGURE 3 @ $\phi = 0.153$ $$\frac{K\partial T/\partial x}{2q} = .92$$

whence $$\frac{\partial T}{\partial x} = \frac{.92 \times 2 \times 10^6}{9.8} = 1.85 \times 10^{5°} \text{ C./in.}$$

for this gradient it is seen from Equation 35 that the attempted radius is $$r = \frac{1}{17.6 \times 10^{-6} \times 1.85 \times 10^5} = .320″$$

and the slot periodicity is $a = .160″$ max.

Since the pulse temperature rise is high, a trial design at one hundred percent (100%) fluctuation at the water surface will reduce the steady flow correction (Equation 32) to the lowest value. From FIGURE 5 where $\Sigma q_n/q_{oo} = 1.0$ is assumed to represent a one hundred percent (100%) fluctuation and a duty less 0.01, it may be seen that the thickness factor is $$l\sqrt{\frac{w}{2k}} = 1.0$$

Thus, the anode thickness is $$l = \sqrt{\frac{2k}{w}} = \sqrt{\frac{2 \times 7.1}{2 \times 250}} = .095″$$

and from Equation 32

$$T = \frac{10^6 \times 7 \times 10^{-6} \times 250 \times .095}{9.8} = 16.9° \text{ C.}$$

Average temperature rise through the body. This is so small that it may be desirable to provide safety factor in the design by the provision of lateral conductivity and by making for less stringent heat transfer at the water boundary. If ten percent (10%) fluctuations are assumed then from FIGURE 5 $\Sigma q_n/_{\infty}=0.10$, and the thickness factor is $$3.0 = l\sqrt{\frac{w}{2k}}$$

whence $$l = 3.0 \times .095 = 0.285''$$

and again from Equation 32

$$T = 16.9 \times 3 = 50.5° \text{ C. average temperature rise}$$

In this latter case the peak temperature is then $$705° \text{ C.} + 50.5° \text{ C.} = 755.5° \text{ C.}$$

Figure 7:
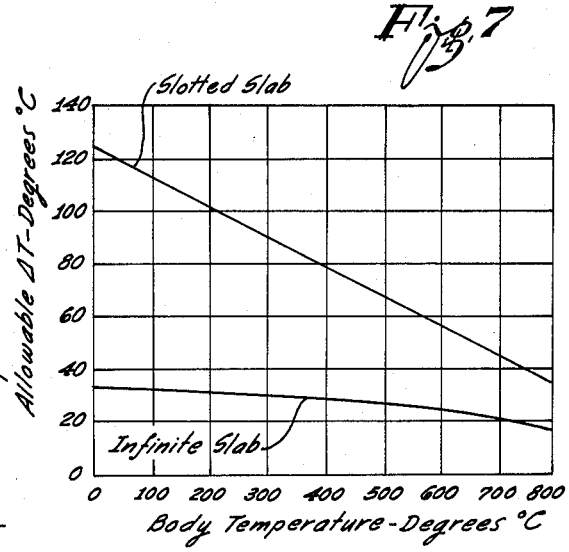
FIGURE 7 is a graph including plots of allowable temperature change in degrees centigrade versus body temperature in degrees centigrade for a slotted and infinite slab of copper.
Figure 8:
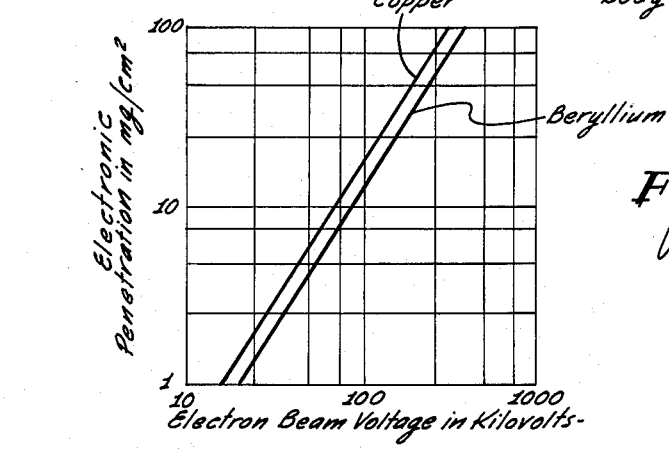
FIGURE 8 shows the relationship of electron penetration (in milligrams per centimeter squared) versus electron beam voltage (in kilovolts) for copper and beryllium.

This is about equal to the allowed rise of FIGURE 7 which is at 700° C. Thus, even with slotting there may be strain cracks but they will be minimized by the slots.

The vanes should extend into the body to a depth such that the fluctuating component of temperature does not exceed 110° C. (for at that point in the body the average term is low and the temperature which determines rupture strength is the temperature at the bottom of the slot). In FIGURE 2, the temperature distribution is determined when the electrons are assumed not to penetrate the semi-infinite body. The effect of penetration exists only at the bombarding surface and does not materially alter the heat flow deep in the body. Assuming no beam penetration one finds $$T = \frac{2q_0}{K}\sqrt{\frac{k\tau}{\pi}} = \frac{2 \times 10^6}{9.8}\sqrt{\frac{7.1 \times 7 \times 10^{-6}}{\pi}} = 810° \text{ C.}$$

To find the temperature deep in the body, use FIGURE 2. The ordinate value to be used is $100°/810° = .124$ and the peak of temperature must pass the bottom of the groove before the next pulse so $$\alpha = \frac{1}{250} \times \frac{1}{7 \times 10^{-6}} = 572 \text{ max.}$$

Inspection of FIGURE 2 shows that a value of $\phi=11$ would pass through 0.012 at $\alpha=100$. Thus, $$X = 11 \times 2\sqrt{k\tau} = 22\sqrt{7.1 \times 7 \times 10^{-6}} = 0.150'' \text{ deep}$$

Thus, it is concluded that the best design would be one in which the anode is 0.285'' thick, cooled by a heat exchanger capable of handling $qd \times 110\% = 1950$ watts/in.² The surface of the anode facing the electron beam should be slotted in a rectangular grid of .160'' pitch to a depth of 0.150''. Under these conditions, the inner surface will reach a temperature of 750° C. above the temperature of the fluid cooled boundary. The beam penetrates into the copper .0021'' and the effect of the penetration is the reduction of the pulse temperature rise from 810° C. to 705° C. because of the addition of the heat capacity.

In contrast to the design example set forth hereinabove, it has been found that it is advantageous to include a thin layer of low atomic weight metal over the main body of the copper anode. An example of the calculations for an arrangement similar to that for copper is presented below.

The depth of penetration from FIGURE 8 is 39 mg./cm.² at 200 kv. At 1850 mg./cc. this corresponds with a depth of .00835'' (.021 cm.). For beryllium (Be) we have the following properties:

Thermal expansion coefficient — $b=8.0 \times 10^{-6}$ in./in./° C.
Thermal conductivity — $K=1.5$ watts/in./° C./in.
Diffusivity — $k=0.76 \ 2.5 \times k/Cp \times$ sp. gr.
Penetration depth of electron — $p=.00835$ inch.
Pulse length — $\tau=7 \times 10^{-6}$ seconds.
Peak intensity of heat flux — $q=10^6$ watts/in.² whence $$\phi = \frac{.00835}{2\sqrt{.76 \times 7 \times 10^{-6}}} = 1.82$$

and from FIGURE 3

$$T \text{ or } \frac{Kp}{k\tau q} = 1.0$$

thus, $$T_{o\tau} = 1.0 \times \frac{k\tau q}{Kp} = \frac{.76 \times 7 \times 10^{-6} \times 10^6}{1.5 \times .00835} = 425° \text{ C.}$$

as compared to 705° C. for copper, and from FIGURE 3

$$\frac{K \frac{\partial T}{\partial x}}{2q} = 0.31$$

$$\frac{\partial T}{\partial x_p} = .31 \times \frac{2q}{K} = \frac{.31 \times 2 \times 10^6}{1.5} = 4 \times 10^{5°} \text{ C./in.}$$

as compared to $1.85 \times 10^{5°}$ C./in. for copper.

$$\text{and } r = \frac{1}{8 \times 10^{-6} \times 4 \times 10^5} = .314''$$

whence $"a" = .157''$, about the same for copper.

From equation (34) we see that the term $$\frac{1}{1-\sigma}$$

is omitted. Since this is an unslotted surface, $$\frac{S}{\Delta T} = b \times E = 8 \times 10^{-6} \times 40 \times 10^6 = 320 \#/\text{in.}^2/° \text{ C.}$$

and at 425° C.

$$S = 320 \times 425 = 13,600 \text{ p.s.i. which is less than the yield}$$

stress for Be at this temperature. Thus, no dicing is necessary and no fatigue cracking will occur.

It should be noted that the use of a thin layer of beryllium is especially useful for short pulse operations when only the heating effects of the electron beam are considered. More particularly, it can be demonstrated that an anode structure having a thin layer of beryllium, such as 8 mils thick for example, in combination with a copper main anode structure is capable of withstanding the heating effects of many cycles of a 200 kilovolts beam when the duration of the beam pulse is less than 22 microseconds. Referring to FIGURE 19, it can be seen that the temperature rise of beryllium is less than that of copper below 22 microseconds. Since the beryllium is not stressed beyond its yield point as discussed above, it is a far superior material than copper for exposing to the electron beam for short pulse operation from both the temperature and stress points of view.

The calculations presented hereinabove have been based upon planar geometry and laminar flow. However, the pulse temperature rise occurs before the heat wave has penetrated deeply enough into the copper to make this assumption invalid for the generally cylindrical geometry which is employed. The steady state term of Equation 32 may need correction for this effect and an approximate correction follows it.

Figure 5:
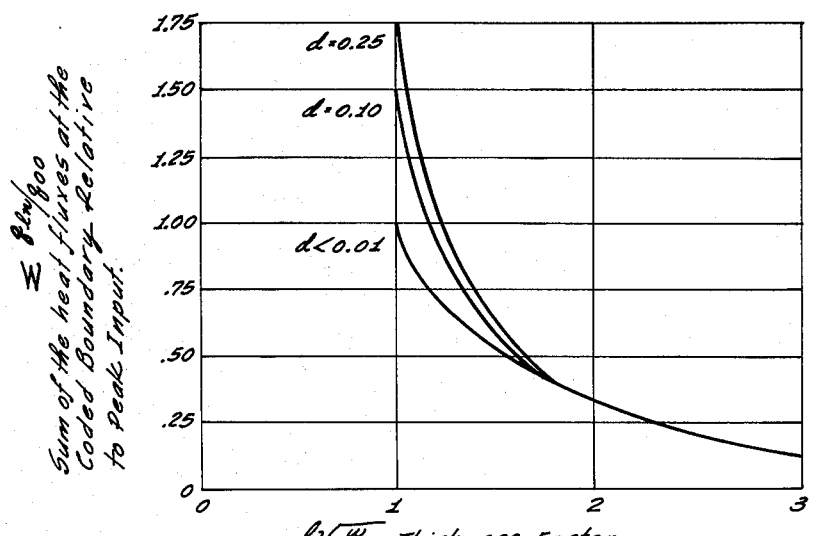
FIGURE 5 is a plot of the absolute sum of heat fluxes at the cooled boundary relative to the peak input for various duties versus a thickness factor.

Often the minimum thickness for an anode structure, which may be determined from FIGURE 5, is not sufficient to enable the external cooling arrangement to effectively remove the heat from the outer boundary surface of the anode structure. In the event this occurs, the designer of the anode structure must either arbitrarily increase the thickness of the anode or increase the effectiveness of the cooling surface of the external boundary to accommodate dissipating the heat absorbed by the anode. Thus, the ultimate objects sought to be obtained by the present invention might be defeated by improper design of an external heat exchanger.

Reflection of heat at boundaries has been vaguely outlined in the analysis of Case 4 dealing with thickness criteria. In Equation 28 it is seen that $T/q$ varies $k^{1/2}K^{-1}$. When heat is transferred from a material with a higher value of this ratio to a material having a lower value, the reflected heat wave is negative and the temperatures and stresses will be reduced. In this respect the heat transfer problem is analogous to transmision line reflections.

The calculation of thermal stresses discussed in accordance with the invention are conservative in that the temperature gradients from FIGURE 3 are the maximum values for each and they do not simultaneously exist as we use them in the analysis. A safety factor of less than two is indicated.

Since periodic heat flow does not permit annealing to reduce stress in view of the cyclic nature of the stress, the material will tend to work harden. When cracks do occur they occur along boundaries of crystals whose size is determined by the extent of work hardening. However, it is possible to cause cracks to occur in the anode surface under extreme stress conditions after only one pulse of the electron beam. The depth of the cracks will be determined by the crystal lattice which exists within the anode material as a result of the material being annealed during the process of exhausting the device in which the anode is utilized.

Referring now to the drawings wherein like or corresponding parts are designated by the same reference characters throughout the several views, there is shown in FIGURE 9 the output end of a high power klystron tube 12. As shown in the ilustrative embodiment of FIGURE 9, the klystron 12 includes a cathod as a source of electrons for an electron beam, which has not been shown, several cavity resonators such as the output cavity 14, several drift tubes such as 16 and 18 and a collector anode 20 along the path of the electron beam. The output cavity 14 includes an output coupling arrangement 22 for extracting microwave energy from the tube.

Considering now the collector anode as shown in FIGURE 9 with more particularity, the inner surface of a main anode section 24 has a thin layer 26 of a low atomic weight material, such as beryllium for example, which is highly resistant to high temperature build-up. As shown in FIGURES 9 and 10, the thickness of the protective layer 26 is substantially less than the main anode section 24. It is not to be inferred from FIGURE 10 that the relative radius of the beryllium cylinder to the radius of the main anode body is a limitation. It is significant to note that the thickness of the main anode body may be thinner than shown in FIGURE 10 and yet operate satisfactorily.

The beryllium layer is in direct contact with section 24, permitting the energy generated by the electron beam to be readily transferred to the main body of the collector. The main body 24 has a spiral groove 28 therein which provides a fluid carrying passageway for a circulating fluid to absorb the heat generated by an impinging beam. The circulating fluid enters an inlet opening 30 and leaves through an outlet opening 32.

The thickness of the beryllium coating is determined by referring to FIGURE 8 which gives the depth of penetration in milligrams per square centimeter for a given electron beam voltage. By dividing the depth of penetration as read from the graph of FIGURE 8 by the density of beryllium, the depth of penetration may be determined. A thickness of twice the depth of penetration is to be preferred, but significant improvement as compared with plain copper may be obtained with thickness of from 0.5 to 5.0 times the penetration depth.

Referring now to FIGURES 11, 12 and 13, there is shown an alternative form of anode structure in which an inner surface covering 34 is affixed to the massive conductive member 24. As shown in the enlarged view of FIGURE 13, the inner surface covering 34 comprises protruding portions formed of beryllium strips 36 which coincide with the inner conical configuration of the main anode body. In this illustrative embodiment the strips of beryllium extend radially toward a remote center 35 and the thickness of the beryllium strips is about 0.0167 inch, about twice the penetration depth of an electron into beryllium for a 200 kilovolt electron beam. The strips are spaced 0.157 inch apart as discussed hereinabove in connection with thermally induced stresses and Equation 35. As discussed in connection with the second example hereinabove, the strips are not required where $T_{or}$ was 425° C. However, where a higher temperature exists and stresses are built up, it is advantageous to utilize the strip configuration.

In operation, both the solid inner covering 22 and the strips 36 intercept the electron of the beam and rapidly absorb the energy generated thereby. The heat generated in the inner covering is transferred to the main anode body by conduction. The heat transferred to body 24 is in turn absorbed and carried away by the cooling fluids which are circulated through the passages 28. The essential difference between the two embodiments is that of function. The strip configuration is specifically designed to relieve stress conditions which would be associated with a pulsed electron beam.

Continuing with the description of the invention with reference to FIGURE 14, there is shown another alternative embodiment of the invention in which a thin tapered cylinder 38 of low atomic weight material, such as beryllium, is cooled by a high velocity high atomic weight cooling fluid. When the term low atomic weight material is employed in the present specification and claims, a material having a lower atomic weight than the high conductivity metal, such as copper, which is employed for the main part of the anode is intended. In a similar manner, when the term high atomic weight cooling fluid is employed in the specification and claims, a fluid having an atomic weight as high as or higher than the atomic weight of sulphur, hexafluoride for example, is intended. As shown in FIGURE 14, the outer cylindrical enclosure member 40 is disposed concentric with the beryllium member 38 and spaced therefrom by several perforated disc-like members 42. Extending from the cylindrical wall of the enclosure member is a pair of tubes 44 and 46 which function as the inlet and outlet openings respectively for the high pressure cooling fluid.

In this illustrative embodiment of the invention, the circulating fluid may be a high atomic gas, such as sulfur hexafluoride for example. The molecular weight of sulfur hexafluoride is 146.06 as noted at page 500 in the "Handbook of Chemistry and Physics" by Charles D. Hodgman, MS, Chemical Rubber Publishing Co., Cleveland, Ohio, Thirtieth Edition, 1948. The gas need not be limited to the example cited, but may be any one of a number of known commercially available types which have a relatively high molecular weight, preferably substantially higher than the atomic weight of beryllium.

In FIGURE 15, there is shown still another embodiment of the invention illustrating the manner in which a plurality of fluid volumes of progressively increasing pressure are utilized to cool a plurality of concentric beryllium membranes. As shown in FIGURE 15, a plurality of thin conical membranes 42 through 50 are disposed concentrically with an outer enclosure member 52. The thin beryllium membranes, for example about 0.002 inch thick, are separated from one another by a plurality of spacing members designated 54, the 0.002 inch thin membranes being thick enough to maintain a good vacuum between the vacuum volume of the tube and the gas chambers. The outer enclosure member 52 of the anode has a thin layer of beryllium 55 with a grid of slots formed therein mounted on the inner surface thereof facing the outermost conical membrane 50, and a cooling fin arrangement 57 mounted on the external surface thereof. Both the layer of beryllium and cooling fins provide additional means for dissipating heat. The thin layer of beryllium functions in the same manner as the inner surface covering 34 shown in FIGURE 11, in which the fins of arrangement 57 may be cooled by blowing air across the structure.

In this illustrative embodiment of the invention, the anode 12 is divided into five chambers of successively higher pressures, the lowest pressure being near the membrane 42 facing the electron beam and the highest pressure being remote from the electron beam. Each chamber has an inlet and outlet opening and an associated pressure check valve 56 through 62 interconnecting adjacent chambers. A cooling system 64, comprising a heat exchanger 66 and a pump 68, is connected to the anode 12 to provide an arrangement for dissipating the heat absorbed by the circulating fluid and for recirculating the gas. An inlet tube 70 is connected to the inlet opening of the high pressure chamber and the heated fluid returns to the cooler system through outlet tube 72.

The arrangement of the cooling system and pressure check valves are shown only as an illustrative example of one arrangement which might be employed. For example, it might be desirable to have the pressure check valves outside the main body of the anode. Such an arrangement would enable one to repair the pressure valves in the event they become inoperative. Thus, it is expressly understood that the embodiment shown in FIGURE 15 is not to be construed as a limitation of the invention.

In FIGURE 16, there is shown a circuit diagram of a klystron tube 82 including an anode structure of the type shown in FIGURE 15. The diagram illustrates the use of a pulse modulator 80 in the form of a clock diagram for pulsing the electron beam of the klystron. In this embodiment of the invention, a cathode terminal 83 at the left-hand end of the cathode housing structure 85 is connected to the negative side of modulator 80 while the positive side of the modulator is connected to the body of the tube. The anode 12 is held at a positive direct current potential by a voltage source represented by a battery 84. In operation, the anode is subjected to a series of pulses, the width and repetition rate are determined by the modulator. For purposes of illustration, it is to be understood that the pulse widths generated by the modulator are on the order of twenty microseconds, and the anode structure is subjected to pulses of the same order as discussed hereinabove.

Reference is also made to P. W. Crapuchettes et al. patent application Serial No. 846,728, filed October 15, 1959, entitled "Broadband Klystron," in which a similar cathode is used, and the location of the cathode within the housing 85 is shown. In addition, it may be noted that the general klystron tube construction and external circuitry of FIGURE 16 may be employed with the other anode constructions, designated by the reference numeral 12 in FIGURES 9 through 15, substituted for the anode 12 of FIGURE 16.

The devices shown in FIGURES 14 and 15 are functionally similar. The device shown in FIGURE 14 has a single gas chamber and all of the heat transfer occurs therein, whereas, in the device of FIGURE 15 the transfer of heat occurs in the several chambers. For certain applications, it is apparent that the arrangement of FIGURE 15 may be more advantageous. For example, it may be advantageous to maintain the collector anode 12 at a predetermined temperature, and since the device has several gas chambers, inner beryllium coating, cooling fins and an associated cooling system it is possible to dissipate a larger amount of heat and control the process more readily with the more elaborate arrangement.

In operation, the devices shown in FIGURES 9, 11, 14 and 15 are the same except the manner in which the heat generated by the electron beam is dissipated. More particularly, the electron beam is emitted from the cathode and focussed along the axis of the device, through the aid of a solenoidal magnetic field produced by an associated magnet which has not been shown. The electron beam passes through drift tubes 16 and 18. In the process of spreading, the beam is relatively uniformly distributed over the membranes 28, 38 or 42 and the strips 36 of inner covering 34 such that the heat generated thereby is not concentrated on any one spot. In the instance of the covering 26 and the strips 36, heat is transferred therefrom to the main anode body 24 by means of conduction. The main anode section, as disclosed by the present illustrative embodiment, is of copper which is a relatively good heat conductor. It should be expressly understood that the invention is not limited to the use of copper for the main anode section since any good heat of conduction material, such as aluminum for example, may be utilized.

The advantages derived from the use of the novel composite anode structures and arrangements in accordance with the teachings of the invention as described hereinabove will now be considered. Owing to the fact that the inner beryllium arrangement is a low atomic weight material, it has a greater heat dissipating capacity than the metals, such as copper, traditionally utilized for collectors in high voltage electron beam devices. The ability of the lower atomic weight material to dissipate heat is due to the fact that the impinging electrons are readily slowed down by the atoms of the beryllium as they pass through the material, but are not readily captured. Accordingly, the electrons penetrate beryllium several times further than into copper. The beryllium is capable of receiving a large number of electrons without the accompanying surface heat build-up traditionally associated with the higher atomic weight materials. Instead, the beryllium is heated to a considerable depth with the more uniform heating producing much less stress. The fact that the electrons of the low atomic weight beryllium are more tightly bound to the nucleus of its atom than that of the larger atomic weight materials, provides the added advantage of substantially reducing or eliminating the possibility of secondary emission which is customarily associated with high voltage electron beam devices.

Another advantage arises from the fact that the beryllium is in intimate contact with a higher atomic material, which may be either a metal or gas in accordance with the invention, which has a relatively large mass or volume to absorb the heat transferred thereto from the beryllium by conduction and for absorbing the additional heat generated by the electrons after they pass through the beryllium. Thus, it is possible to provide an associated massive main anode body or a relatively large volume of gas which is capable of being adequately cooled to eliminate excessive heating of the composite anode structure, thereby avoiding the cracking, flaking-off and outgassing of the collector anode experienced with prior art structures as a result of thermal stresses.

Finally, owing to the fact that the beryllium has the outstanding characteristics of light weight and moderately good heat transfer characteristics, it is possible to provide a collector anode structure which is substantially smaller in physical size than prior art anodes. Reduction in size and weight is especially advantageous when the device is employed for air-borne applications.

While the collector anode structure of the invention has been described with reference to several embodiments for a linear beam device, it will be understood that various modifications could be made in the construction arrangement or configuration thereof without departing from the spirit and scope of the invention. Thus, by way of example, but not of limitation, the anode of a magnetron may be covered with a layer or strips of a low atomic material. FIGURES 17 and 18 illustrate the manner in which a plurality of beryllium strips 72 may be affixed to several of the exposed surfaces of a plurality of anode vanes 74. In the illustrative embodiment the vanes are of copper affixed to a cylindrical anode body 76, also of copper, and extending radially inward from the anode body. The vanes form an interaction space surrounding a cathode 78 which provides a source of electrons. In operation, the electrons are emitted from the cathode and collected on the vanes in a conventional manner. Since the principle of operation and function of a magnetron is well known by those skilled in the microwave tube art, further discussion of the magnetron is considered unnecessary. It will be appreciated by those versed in the microwave tube art that substantial advantages will be derived by utilizing the beryllium as a protective coating for the vanes when considered in view of the discussion hereinabove regarding the linear beam collector anodes.

It is to be expressly understood that the foregoing description shall be interpreted only as illustrative of the invention. Thus, by way of example and not of limitation, other metals such as aluminum or titanium could be used instead of beryllium; in addition, the various techniques for reducing heat disclosed hereinabove may be employed in connection with other known tube geometries. Accordingly, the spirit and scope of the invention is to be limited only by the appended claims when accorded the broadest interpretation consistent with the basic concepts taught herein.

What is claimed as new is:

1. In combination, a vacuum envelope, a cathode, an anode structure and means for directing a beam of electrons from said cathode to said anode, said anode structure comprising a conductive surface for collecting electrons in the beam and at least one thin electron permeable cylindrical tapered beryllium membrane spaced from said conductive surface and facing said beam and means for circulating a cooling fluid in the volume between said conductive surface and said membrane to remove and dissipate heat generated in said membrane and said conductive surface by said electron beam.

2. In combination, a vacuum envelope, a cathode, an anode structure and means for directing a beam of electrons from said cathode to said anode, said anode structure comprising a series of successive spaced thin beryllium electron permeable membranes separated by a corresponding number of graded pressure volumes for circulating gas to remove and dissipate heat generated in said anode by said electron beam.

3. The combination defined in claim 2 wherein said anode also includes a corresponding number of pressure check valves for controlling the flow of cooling gas to and from said volumes.

4. The combination defined in claim 3 which further includes a heat exchanger and circulating fluid pump.

5. In combination, vacuum tube including an anode structure and means for directing an electron beam toward said anode structure at a predetermined voltage level, means for modulating said electron beam into pulses, said anode structure including a massive copper anode member, means for cooling said anode member, a thin layer of beryllium having a thickness equal to about twice the penetration depth of electrons at said predetermined voltage level on the surface of said copper member, the surface of said beryllium layer being slotted by a series of spaced cuts, at least two additional successive beryllium membranes spaced from said slotted layer to define spaced chambers, and means for circulating gas through said chambers at different pressures.

6. In combination, a vacuum tube including an anode structure and means for directing an electron beam toward said anode structure at a predetermined voltage level and of sufficient electron intensity to produce at least $10^6$ watts of heat per square inch at the surface of the anode structure facing the electron beam, means for modulating said electron beam into pulses, said anode structure including a massive copper anode member, means for cooling said anode member, a thin layer of beryllium having a thickness equal to about twice the penetration depth of electrons at said predetermined voltage level on the surface of said copper member, the surface of said beryllium layer being slotted by a series of spaced cuts, at least two additional successive beryllium membranes spaced from said slotted layer to define spaced chambers, and means for circulating gas through said chambers at different pressures.

7. In combination, a vacuum tube including an anode structure and means for directing an electron beam toward said anode structure, said anode structure including a massive anode member of good heat conductivity, at least two successive electron permeable metallic membranes spaced from said anode member to define first and second spaced chambers, and means for circulating gas through said first and second chambers at respectively different pressures.

References Cited by the Examiner
UNITED STATES PATENTS

| | | | |
|---|---|---|---|
| 1,908,366 | 5/1933 | Kingsbury | 313—311 |
| 2,549,596 | 4/1951 | Hamilton et al. | 29—199 |
| 2,888,584 | 5/1959 | Hickey | 315—5.38 |
| 2,949,558 | 8/1960 | Kompfner | 315—39.3 X |
| 2,972,080 | 2/1961 | Espersen | 315—5.38 |
| 3,064,153 | 11/1962 | Gage | 313—231 |
| 3,104,338 | 9/1963 | Symons | 313—311 X |

HERMAN KARL SAALBACH, *Primary Examiner.*
GEORGE WESTBY, *Examiner.*
S. CHATMON, JR., *Assistant Examiner.*